US011428780B2

(12) United States Patent
Zhang et al.

(10) Patent No.: US 11,428,780 B2
(45) Date of Patent: Aug. 30, 2022

(54) NEAR FIELD USER DETECTION USING A RADAR SIGNAL ANALYSIS ASSOCIATED WITH A USER EQUIPMENT

(71) Applicant: QUALCOMM Incorporated, San Diego, CA (US)

(72) Inventors: Nan Zhang, San Diego, CA (US); Roberto Rimini, San Diego, CA (US); Jong Hyeon Park, San Jose, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 280 days.

(21) Appl. No.: 16/593,453

(22) Filed: Oct. 4, 2019

(65) Prior Publication Data

US 2021/0103028 A1 Apr. 8, 2021

(51) Int. Cl.
*G01S 7/40* (2006.01)
*G01S 7/292* (2006.01)
(Continued)

(52) U.S. Cl.
CPC .......... *G01S 7/4056* (2013.01); *G01S 7/2922* (2013.01); *G01S 7/4021* (2013.01); *G01S 13/343* (2013.01); *G01S 13/88* (2013.01)

(58) Field of Classification Search
CPC ........ G01S 13/343; G01S 13/56; G01S 13/88; G01S 7/006; G01S 7/2922; G01S 7/4013;
(Continued)

(56) References Cited

U.S. PATENT DOCUMENTS 6,664,920 B1 12/2003 Mott et al.
7,379,013 B2 5/2008 Dean et al.
(Continued)

FOREIGN PATENT DOCUMENTS

WO 2018210427 A1 11/2018

OTHER PUBLICATIONS

Yamaguchi K., et al., "A 24 GHz Band FM-CW Radar System for Detecting Closed Multiple Targets with Small Displacement", Tokyo University of Science, Suwa, 2015, pp. 268-273.
(Continued)

*Primary Examiner* — Timothy X Pham
(74) *Attorney, Agent, or Firm* — Thien T. Nguyen

(57) ABSTRACT

Various aspects of the present disclosure generally relate to wireless communication. In some aspects, a user equipment receives a sliding window of measurements associated with a radar signal transmitted by the UE; determines that a user is within a threshold distance of the UE, wherein the threshold distance is determined to be a first distance when an energy measurement, associated with the radar signal, indicates an energy reduction satisfying a threshold energy reduction, or wherein the threshold distance is determined to be a second distance when the sliding window of measurements indicates an amount of energy variation satisfying a threshold amount of energy variation associated with the radar signal; and performs, based at least in part on determining that the user is within the threshold distance, an action associated with a communication signal of the UE. Numerous other aspects are provided.

30 Claims, 7 Drawing Sheets

(51) Int. Cl.
*G01S 13/34* (2006.01)
*G01S 13/88* (2006.01)

(58) Field of Classification Search
CPC .............. G01S 7/4021; G01S 7/4056; H04W 52/0238; H04W 52/0245; H04W 52/0251; Y02D 30/70
See application file for complete search history.

(56) References Cited

U.S. PATENT DOCUMENTS

| | | | |
|---|---|---|---|
| 8,749,429 B2 | 6/2014 | Heilmann et al. | |
| 10,120,072 B2 | 11/2018 | Larocque et al. | |
| 2013/0172045 A1* | 7/2013 | Caballero | H04W 52/246 455/552.1 |
| 2014/0148225 A1* | 5/2014 | Gao | H04W 52/0254 455/566 |
| 2014/0342784 A1* | 11/2014 | Pan | H04W 52/0254 455/572 |
| 2016/0105854 A1* | 4/2016 | Lee | H04B 17/102 455/127.2 |
| 2016/0294446 A1* | 10/2016 | Rumler | F24F 11/30 |
| 2016/0327634 A1 | 11/2016 | Katz et al. | |
| 2017/0140593 A1* | 5/2017 | Plüss | G07C 9/00563 |
| 2017/0248725 A1* | 8/2017 | Yang | G01V 3/08 |
| 2017/0290011 A1* | 10/2017 | Kushnir | H01Q 3/36 |
| 2018/0287651 A1* | 10/2018 | Fernando | H04W 52/283 |
| 2019/0302250 A1 | 10/2019 | Sahin et al. | |
| 2020/0006988 A1* | 1/2020 | Leabman | H05B 3/34 |
| 2020/0393890 A1* | 12/2020 | Hayashi | G06F 1/3265 |
| 2021/0203191 A1* | 7/2021 | Kim | H02J 50/80 |

OTHER PUBLICATIONS

International Search Report and Written Opinion—PCT/US2020/052802—ISA/EPO—dated Jan. 13, 2021.

* cited by examiner

NEAR FIELD USER DETECTION USING A RADAR SIGNAL ANALYSIS ASSOCIATED WITH A USER EQUIPMENT

FIELD OF THE DISCLOSURE

Aspects of the present disclosure generally relate to user detection and to near field user detection using a radar signal analysis associated with a user equipment.

BACKGROUND

Wireless networks may utilize high frequencies and small wavelengths to provide high data rates. In particular, fifth generation (5G)-capable devices communicate using frequencies at or near the extremely-high frequency (EHF) spectrum with wavelengths at or near millimeter wavelengths. Although higher frequency signals provide larger bandwidths to efficiently communicate large amounts of data, these signals suffer from higher path loss (e.g., path attenuation). To compensate for the higher path loss, transmit power levels can be increased or beamforming can concentrate energy in a particular direction.

Accordingly, the Federal Communications Commission (FCC) has determined a maximum permitted exposure (MPE) limit. To meet targeted guidelines, devices are responsible for balancing performance with transmission power and other constraints. This balancing act can be challenging to achieve, especially with devices that have cost, size, and other considerations.

SUMMARY

In some aspects, a method may include receiving, by a user equipment (UE), a sliding window of measurements associated with a radar signal transmitted by the UE; determining, by the UE, that a user is within a threshold distance of the UE, wherein the threshold distance is determined to be a first distance when an energy measurement, associated with the radar signal, indicates an energy reduction satisfying a threshold energy reduction, or wherein the threshold distance is determined to be a second distance when the sliding window of measurements indicates an amount of energy variation satisfying a threshold amount of energy variation associated with the radar signal; and performing, by the UE and based at least in part on determining that the user is within the threshold distance, an action associated with a communication signal of the UE.

In some aspects, a UE for wireless communication may include a memory and one or more processors coupled to the memory. The memory and the one or more processors may be configured to receive a sliding window of measurements associated with a radar signal transmitted by the UE; determine that a user is within a threshold distance of the UE, wherein the threshold distance is determined to be a first distance when an energy measurement, associated with the radar signal, indicates an energy reduction satisfying a threshold energy reduction, or wherein the threshold distance is determined to be a second distance when the sliding window of measurements indicates an amount of energy variation satisfying a threshold amount of energy variation associated with the radar signal; and perform, based at least in part on determining that the user is within the threshold distance, an action associated with a communication signal of the UE.

In some aspects, a non-transitory computer-readable medium may store one or more instructions for wireless communication. The one or more instructions, when executed by one or more processors of a UE, may cause the one or more processors to: receive a sliding window of measurements associated with a radar signal transmitted by the UE; determine that a user is within a threshold distance of the UE, wherein the threshold distance is determined to be a first distance when an energy measurement, associated with the radar signal, indicates an energy reduction satisfying a threshold energy reduction, or wherein the threshold distance is determined to be a second distance when the sliding window of measurements indicates an amount of energy variation satisfying a threshold amount of energy variation associated with the radar signal; and perform, based at least in part on determining that the user is within the threshold distance, an action associated with a communication signal of the UE.

In some aspects, an apparatus for wireless communication may include means for receiving a sliding window of measurements associated with a radar signal transmitted by a UE; means for determining that a user is within a threshold distance of the UE, wherein the threshold distance is determined to be a first distance when an energy measurement, associated with the radar signal, indicates an energy reduction satisfying a threshold energy reduction, or wherein the threshold distance is determined to be a second distance when the sliding window of measurements indicates an amount of energy variation satisfying a threshold amount of energy variation associated with the radar signal; and means for performing, based at least in part on determining that the user is within the threshold distance, an action associated with a communication signal of the UE.

Aspects generally include a method, apparatus, system, computer program product, non-transitory computer-readable medium, user device, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
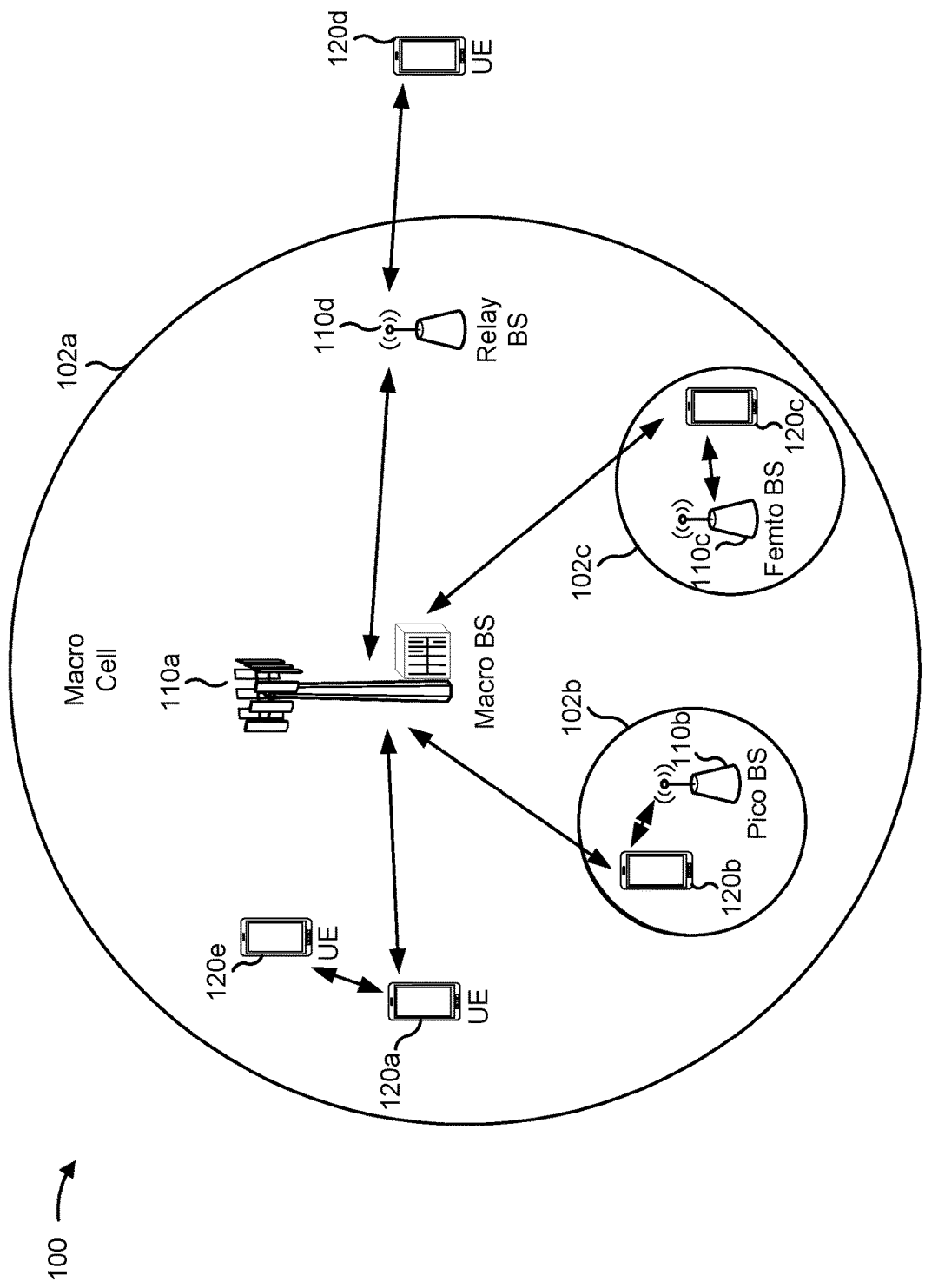
FIG. 1 is a diagram conceptually illustrating an example of a wireless communication network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

A user equipment (UE) may use a high transmit power to compensate for path loss associated with millimeter wave (mmW) signals. The UE (or any other type of electronic device) can be physically operated by a user. Such physical proximity presents opportunities for radiation exposure to the user to exceed a given guideline, such as a maximum permitted exposure (MPE) level as determined by a telecommunication standards organization (e.g., $3^{rd}$ Generation Partnership Project (3GPP)) and/or a communications regulatory agency (e.g., United States Federal Communications Commission (FCC)). Because of these issues, it is advantageous to enable a UE to detect proximity of the user.

An MPE level may be different based at least in part on the proximity of the user to the UE. For example, an MPE level for the user being in a near field of the UE may be lower (e.g., approximately 10 decibel-milliwatts (dBm) or less) than an MPE level for the user being in a far field of the UE (e.g., approximately 10 dBm to 35 dBm). As used herein, a near field (or near field range) of the UE may be within 4 centimeters (cm) of a user (or a range of 0 cm to 4 cm), and a far field (or far field range) of the UE may be greater than 4 cm. The far field may correspond to a range from 4 cm to a threshold distance (e.g., 15 cm) that is considered for an MPE level of the UE with respect to the presence of a user (e.g., a maximum distance within which the presence of the user needs to be monitored according to the 3GPP and/or FCC).

Some previous proximity-detection techniques may use a dedicated sensor to detect the user within the near field and/or far field of the UE, such as a camera, an infrared sensor, or a radar sensor. However, these sensors are bulky, expensive (e.g., in terms of financial cost and space within the UE), and require relatively complex and compute-intensive processing techniques. Furthermore, a single UE can include multiple antennas that are positioned on different surfaces (e.g., on a top, a bottom, or opposite sides) of the UE. To account for each of these antennas, multiple cameras or sensors may need to be installed near each of these antennas, which further increases a cost, size, and/or processing requirement of the UE.

In some instances, a proximity detection may use a wireless transceiver to perform both wireless communication and proximity detection within a far field of the UE. In such cases, a local oscillator circuitry within the wireless transceiver generates a radar signal that can enable proximity detection in the far field. Such a radar signal may include a frequency-modulated continuous wave (FMCW) signal or multi-tone signal. By analyzing a reflection of the radar signal, a distance (e.g., a slant range) to an object (e.g., a user) in the far field can be determined. While such an analysis of a radar signal and/or reflection of the radar signal can be used for proximity detection (which may be referred to herein as "user detection") in the far field, such an analysis may be ineffective in analyzing whether the user is within a near field of the UE, because when a user is within the near field of the UE, the reflected signal may have the same or similar characteristics as if the user is at a distance greater than a maximum distance of the far field of the UE.

According to some aspects described herein, a UE performs near field user detection using a radar signal analysis associated with the UE. For example, the UE may receive measurements associated with a radar signal and determine whether a user is within the near field of the UE based at least in part on one or more characteristics of the measurements. Such measurements may correspond to energy levels of reflections of the radar signal. Further, the one or more characteristics may include whether the energy level satisfies a threshold associated with a reference energy level of the UE, an amount of energy variation of the energy level within a sliding window of the measurements, and/or the like. As described herein, the radar signal used to detect whether the user is in the near field may be the same radar signal (and/or the same type of radar signal, such as an FMCW signal) that is used to determine whether the user is in the far field. In this way, the UE may set a transmission power for a communication signal of the UE based at least in part on whether a user is determined, using a same radar signal, to be within a near field of the UE or within a far field of the UE. Accordingly, some aspects described herein, do not require a separate sensor system and/or separate radar signals to detect that a user is within a near field and a far field of the UE.

FIG. 1 is a diagram illustrating a wireless network 100 in which aspects of the present disclosure may be practiced. The wireless network 100 may be a Long-Term Evolution (LTE) network or some other wireless network, such as a $5^{th}$ generation (5G) or New Radio (NR) network. The wireless network 100 may include a number of base stations (BSs) 110 (shown as BS 110a, BS 110b, BS 110c, and BS 110d) and other network entities. A BS is an entity that communicates with user equipment (UEs) and may also be referred to as a NR BS, a Node B, a gNB, a 5G node B (NB), an access point (AP), a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may be a BS and may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller may couple to a set of BSs and may provide coordination and control for these BSs. The network controller may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
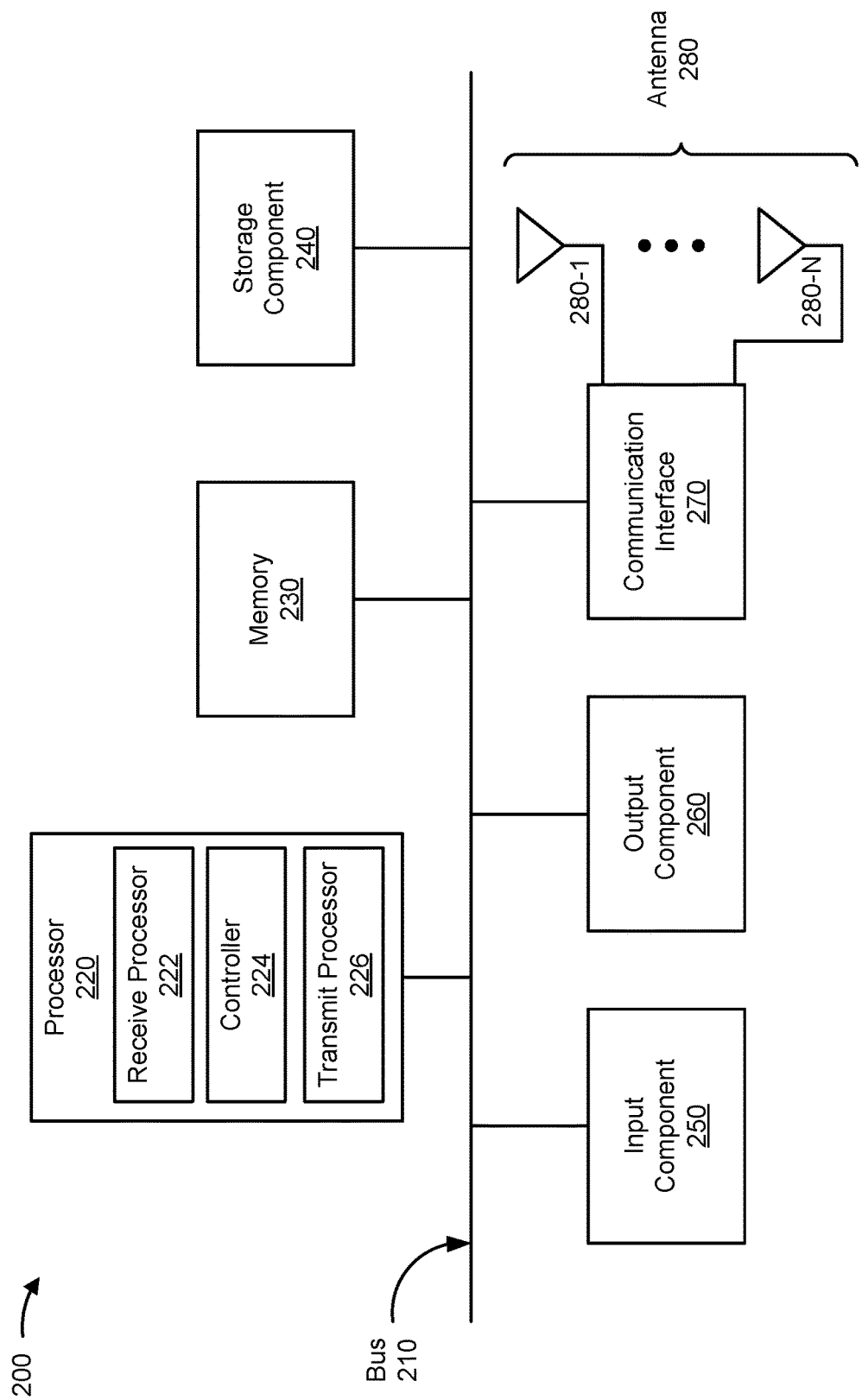
FIG. 2 is a diagram conceptually illustrating example components of one or more devices shown in FIG. 1, such as a user equipment (UE) in accordance with various aspects of the present disclosure.

FIG. 2 is a diagram of example components of a device 200. Device 200 may correspond to UE 120 of FIG. 1. In some aspects, UE 120 may include one or more devices 200 and/or one or more components of device 200. As shown in FIG. 2, device 200 may include a bus 210, a processor 220 (which includes a receive processor 222, a controller 224, a transmit processor 226), a memory 230, a storage component 240, an input component 250, an output component 260, a communication interface 270, and one or more antennas 280-1 to 280-N (referred to herein individually as "antenna 280" and collectively as "antennas 280"), where N≥1 and N corresponds to a quantity of antennas of device 200.

Bus 210 includes a component that permits communication among multiple components of device 200. Processor 220 is implemented in hardware, firmware, and/or a combination of hardware and software. Processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 220 includes one or more processors capable of being programmed to perform a function. Memory 230 includes a random-access memory (RAM), a read only memory (ROM), and/or another type of dynamic or static storage device (e.g., a flash memory, a magnetic memory, and/or an optical memory) that stores information and/or instructions for use by processor 220.

Storage component 240 stores information and/or software related to the operation and use of device 200. For example, storage component 240 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Input component 250 includes a component that permits device 200 to receive information, such as via user input (e.g., a touch screen display, a keyboard, a keypad, a mouse, a button, a switch, and/or a microphone). Additionally, or alternatively, input component 250 may include a component for determining location (e.g., a global positioning system (GPS) component) and/or a sensor (e.g., an accelerometer, a gyroscope, an actuator, another type of positional or environmental sensor, and/or the like). Output component 260 includes a component that provides output information from device 200 (via, e.g., a display, a speaker, a haptic feedback component, an audio or visual indicator, and/or the like).

Communication interface 270 includes a transceiver-like component (e.g., a transceiver, a separate receiver, a separate transmitter, and/or the like) that enables device 200 to communicate with other devices, such as via a wired connection, a wireless connection (e.g., via antenna 280), or a combination of wired and wireless connections. Communication interface 270 may permit device 200 to receive information from another device and/or provide information to another device (e.g., BS 110 of FIG. 1 and/or another UE). For example, communication interface 270 may include an Ethernet interface, an optical interface, a coaxial interface, an infrared interface, a radio frequency (RF) interface, a universal serial bus (USB) interface, a Wi-Fi interface, a cellular network interface, and/or the like.

Antenna 280 may include one or more antenna arrays configured to receive a communication signal (e.g., a downlink signal) and/or transmit a communication signal (e.g., an uplink signal). Antenna 280 may receive downlink signals from a BS (e.g., BS 110) and/or other base stations and may provide received signals to one or more demodulators of communication interface 270. Each demodulator may condition (e.g., filter, amplify, downconvert, and/or digitize) a received signal to obtain input samples. Each demodulator may further process the input samples (e.g., for orthogonal frequency-division multiplexing (OFDM) and/or the like) to obtain received symbols. A multiple-input, multiple-output (MIMO) detector of communication interface 270 may obtain received symbols from the demodulators, perform MIMO detection on the received symbols if applicable, and provide detected symbols. Receive processor 222 may process (e.g., demodulate and decode) the detected symbols, provide decoded data for device 200 to a data sink, and provide decoded control information and system information to a controller 224. A channel processor may determine reference signal received power (RSRP), received signal strength indicator (RSSI), reference signal received quality (RSRQ), channel quality indicator (CQI), and/or the like. In some aspects, one or more components of device 200 may be included in a housing.

On the uplink, transmit processor 226 may receive and process data from a data source (e.g., memory 230, storage component 240, input component 250, and/or the like) and control information (e.g., for reports comprising RSRP, RSSI, RSRQ, CQI, and/or the like) from controller 224. Transmit processor 226 may also generate reference symbols for one or more reference signals. The symbols from transmit processor 226 may be pre-coded by a transmit MIMO processor if applicable, further processed by one or more modulators (e.g., for Discrete Fourier Transform-Spread-OFDM (DFT-s-OFDM), cyclic prefix-OFDM (CP-OFDM), and/or the like), and transmitted, via antenna 280.

In some aspects, device 200 includes means for performing one or more processes described herein and/or means for performing one or more operations of the processes described herein. For example, a UE described in connection with FIG. 2 may include means for receiving a sliding window of measurements associated with a radar signal transmitted by a UE; means for determining that a user is within a threshold distance of the UE, wherein the threshold distance is determined to be a first distance when an energy measurement, associated with the radar signal, indicates an energy reduction satisfying a threshold energy reduction, or wherein the threshold distance is determined to be a second distance when the sliding window of measurements indicates an amount of energy variation satisfying a threshold amount of energy variation associated with the radar signal; and means for performing, based at least in part on determining that the user is within the threshold distance, an action associated with a communication signal of the UE. In some aspects, such means may include one or more components of device 200, such as bus 210, processor 220, receive processor 222, controller 224, transmit processor 226, memory 230, storage component 240, input component 250, output component 260, communication interface 270 (e.g., including one or more demodulators, one or more MIMO detectors, one or more transmit MIMO processors, and/or the like), antenna 280, and/or any combination thereof.

Device 200 may perform one or more processes described herein. Device 200 may perform these processes based at least in part on processor 220 executing software instructions stored by a non-transitory computer-readable medium, such as memory 230 and/or storage component 240. As used herein, the term "computer-readable medium" refers to a non-transitory memory device. A memory device includes memory space within a single physical storage device or memory space spread across multiple physical storage devices.

Software instructions may be read into memory 230 and/or storage component 240 from another computer-readable medium or from another device via communication interface 270. When executed, software instructions stored in memory 230 and/or storage component 240 may cause processor 220 to perform one or more processes described herein. Additionally, or alternatively, hardware circuitry may be used in place of or in combination with software instructions to perform one or more processes described herein.

Thus, aspects described herein are not limited to any specific combination of hardware circuitry and software.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
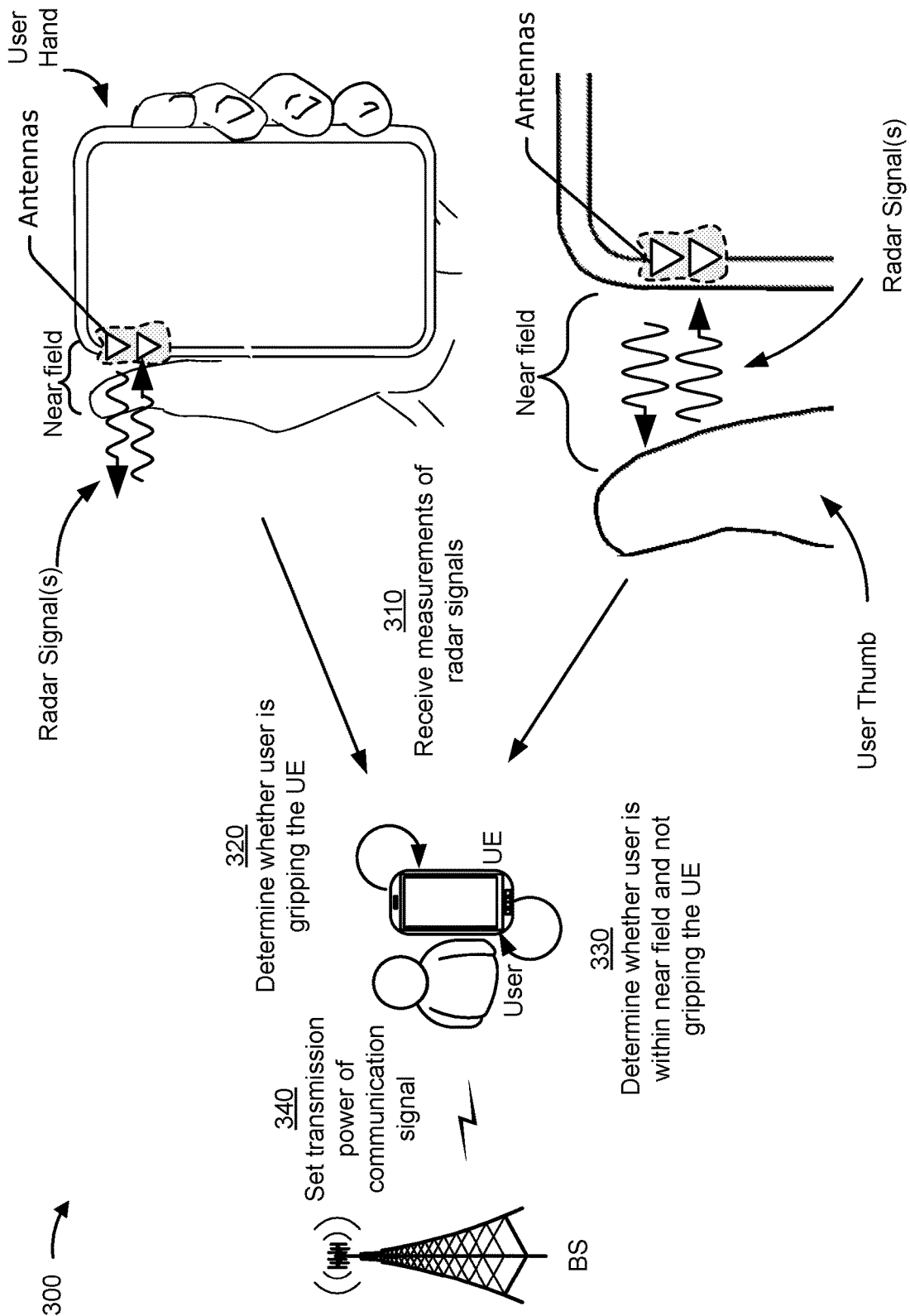
FIGS. 3-6 are diagrams conceptually illustrating examples associated with near field user detection using a radar signal analysis associated with a user equipment in accordance with various aspects of the present disclosure.

FIG. 3 is a diagram conceptually illustrating an example 300 associated with near field user detection using a radar signal analysis associated with a user equipment in accordance with various aspects of the present disclosure. Example 300 includes a UE (e.g., UE 120) and a BS (e.g., BS 110). As described in aspects of example 300, a user is determined to be within a threshold distance (and/or within a near field) of the UE based at least in part on an analysis of one or more measurements of a radar signal. The threshold distance may correspond to a threshold (e.g., 4 cm) that is between a near field of the UE and a far field of the UE. In some aspects, the UE may determine, using an energy measurement of the radar signal, that the user is gripping the UE and thereby determine that the user is within the near field of the UE or determine, from an amount of energy variation indicated in a sliding window of measurements associated with the radar signal, if the user is within the near field of the UE (though not gripping the UE).

As shown in FIG. 3, and by reference number 310, the UE may receive one or more measurements associated with a radar signal that is transmitted from one or more antennas of the UE (e.g., antennas 280). The measurements may include one or more measurements of an energy level (which may be referred to herein as an "energy measurement") of the radar signal and/or an energy level of a reflection of the radar signal. The radar signal may correspond to a proximity detection signal that is used to determine whether the user is within a near field of the UE or a far field of the UE. The radar signal may be an FMCW signal, a multi-tone signal, and/or the like. In some aspects, the radar signal is an FMCW signal. In general, a frequency of the FMCW signal increases or decreases across a time interval. Different types of frequency modulations may be used, including linear-frequency modulations (LFM) (e.g., a chirp), sawtooth-frequency modulations, triangular-frequency modulations, and so forth. An FMCW signal enables radar-based ranging techniques to be utilized to determine a distance from the UE to the user (at least within a maximum distance of a far field and within a near field, as described herein). To achieve a finer range resolution (e.g., on the order of centimeters) for close-range applications, larger bandwidths can be utilized, such as 1 gigahertz (GHz), 4 GHz, 8 GHz, and so forth. For instance, an FMCW signal can have a bandwidth of approximately 4 GHz and include frequencies between approximately 26 and 30 GHz. The finer range resolution improves range accuracy and enables multiple objects (and/or users) to be distinguished in range. Although generation of an FMCW signal may utilize dedicated components of the UE (e.g., local oscillator circuitry of communication interface 270), the FMCW signal can provide an accurate range measurement for a variety of distances in the near field based at least in part on an analysis of an energy level of the FMCW signal, and for a variety of distances in the far field based at least in part on the bandwidth. In some aspects, the FMCW signal may enable a composition of an object to be directly measured to determine that the object is a user. As a result, a user can be detected within a near field and/or a far field using an FMCW signal without the use of complex circuitry and/or sensors. An amount of time for performing proximity detection can also be relatively short (such as within approximately one millisecond) using the FMCW signal and/or a radar signal as described herein.

In this way, the UE may receive and/or monitor one or more measurements associated with the radar signal, to permit the UE to analyze the measurements to determine whether the user is within the near field of the UE.

As further shown in FIG. 3, and by reference number 320, the UE determines whether the user is gripping the UE. For example, the UE may determine that the user is gripping the UE based at least in part on an energy measurement indicating a threshold energy reduction associated with the radar signal. The threshold energy reduction may be based at least in part on a reference energy level associated with the UE. For example, the reference energy level may correspond to a measured energy level of the UE when the UE is in open space (e.g., when there is no object within a particular angular range of the UE).

In some aspects, the reference energy level may be unique to the UE. In such cases, the reference energy level may be determined during a calibration process associated with one or more aspects described herein. For example, during and/or shortly after a manufacturing phase, the UE may undergo the calibration process to determine the reference energy level and/or the threshold energy reduction associated with the radar signal when the UE is gripped. The UE may store and/or maintain the reference energy level and/or threshold energy reduction in a mapping and/or data structure of the UE to permit the UE to compare the energy measurement to the reference energy level and/or determine whether an energy measurement satisfies the threshold energy reduction.

In this way, the UE may determine that the user is gripping the UE (and/or that the user is within 1 cm of the UE) based at least in part on whether an energy measurement indicates an energy reduction satisfying a threshold energy reduction associated with the UE to permit the UE to determine that the user is within the near field of the UE and/or, correspondingly, to control a transmission power of a communication signal from the UE.

As further shown in FIG. 3, and by reference number 330, the UE may determine whether the user is within the near field and not gripping the UE. For example, the UE may determine that the user is within the near field and not gripping the UE based at least in part on an amount of energy variation indicated in a sliding window of measurements satisfying a threshold energy variation. As described herein, the UE may determine the amount of energy variation based on determining a variance of the energy signal and/or a standard deviation of values a quantity of samples of measurements of the energy signal (e.g., measurements in the sliding window of measurements). The quantity of the samples of measurements may correspond to the quantity of measurements in the sliding window of measurements and/or a subset of the quantity of measurements of the sliding window of measurements (e.g., a subset that is configurable according to a desired accuracy level, a desired processing speed, user input, and/or the like).

The sliding window of measurements may correspond to a plurality of most recent measurements that are made and/or received by the UE within a most recent time period. For example, the sliding window of measurements may correspond to a most recent 10 measurements, a most recent 50 measurements, a most recent 100 measurements, and/or the like. Additionally, or alternatively, the sliding window of measurements may correspond to any number of measurements made within a most recent time period, such as within a most recent 10 microseconds, a most recent 50 microseconds, a most recent 100 microseconds, and/or the like.

In some aspects, the threshold amount of energy variation may correspond to a reference amount of energy variation. In such cases, the reference amount of energy variation may be determined during a calibration process associated with one or more aspects described herein. For example, during and/or shortly after a manufacturing phase, the UE may undergo the calibration process to determine the reference amount of energy variation associated with the radar signal when a user is within the near field and not gripping the UE. The UE may store and/or maintain the reference amount of energy variation in a mapping and/or data structure of the UE to permit the UE to determine whether an amount of energy variation in the sliding window satisfies the threshold amount of energy variation. In some aspects, when the radar signal is an FMCW signal, the reference amount of energy variation may equal zero and/or may be within a threshold range of zero (e.g., because an energy level of an FMCW signal is not expected to vary when a user is not within the near field of the UE).

According to some aspects, one or more thresholds herein (e.g., a reference energy level of the UE, a threshold energy reduction, a threshold amount of energy variation, and/or the like) may correspond to one or more characteristics of a physical environment (e.g., temperature, location, barometric pressure, altitude, and/or the like) of the UE (e.g., because different environments may have different effects on the UE). For example, the UE may use a mapping of profiles of the characteristics and corresponding thresholds based at least in part on those characteristics. Accordingly, the UE may determine the one or more characteristics of the physical environment (e.g., using measurements from one or more sensors, such as a temperature sensor, a pressure sensor, location device and/or sensor, a camera, and/or the like) and correspondingly establish and/or set the one or more thresholds that are mapped to the one or more physical characteristics.

In some aspects, the UE may determine one or more thresholds specific to a user of the UE. For example, the UE may determine the one or more thresholds based at least in part on a calibration process performed with the user and/or one or more sensors of the UE. For example, the UE, via a display, may prompt the user to grip the UE, not grip the UE but be within the near field of the UE, be within the far field of the UE, and make corresponding measurements to establish the one or more thresholds described herein.

In some aspects, one or more thresholds described herein may be dynamic and/or adjusted over the time as the user uses and/or interacts with the UE. For example, the UE may automatically (e.g., periodically and/or aperiodically) perform a self-calibration process using one or more sensors to determine that the user is not gripping the UE, setting the reference energy level based at least in part on determining that the user is not gripping the UE, and then use the one or more sensors to determine that the user is gripping the UE to determine the threshold energy reduction that occurs when the user grips the UE, based at least in part on determining that the user is gripping the UE. Correspondingly, the UE may perform a self-calibration process using one or more sensors to determine that the UE is not within a near field of the UE, determining a reference amount of energy variation in a sliding window of measurements, and then use the one or more sensors to determine that the user is within the near field and not gripping the UE, setting the threshold amount of energy variation based at least in part on the determining that the UE is within the near field and not gripping the UE.

In some aspects, the UE analyzes the sliding window of measurements based at least in part on whether the UE detects that the user is gripping the UE. For example, the UE may periodically (or aperiodically) measure an energy level associated with the UE, and if the energy level does not indicate a threshold energy reduction, the UE is to analyze the sliding window of measurements. In some aspects, the energy measurement may be one of the measurements in the sliding window of measurements. For example, the energy measurement may be a most recently received and/or most recently analyzed measurement of the sliding window (where the sliding window of measurements includes the energy measurement and a number of measurements made or received before the energy measurement). As another example, the energy measurement may be a least recently received and/or least recently analyzed measurement of the sliding window (where the sliding window of measurements includes the energy measurement and a number of measurements made or received after the energy measurement). In yet another example, the energy measurement may be an intermediate measurement of the sliding window of measurements (where the sliding window of measurements includes the energy measurement, a first number of measurements made or received before the energy measurement, and a second number of measurements made or received after the energy measurement). In this way, the energy measurement may trigger an analysis of the sliding window of measurements and/or be a reference measurement associated with the sliding window of measurements.

In this way, the UE may determine that the user is within the near field of the UE (and/or within 4 cm of the UE), though the user may not be gripping the UE, to permit the UE to set a transmission power corresponding to the user being within the near field.

As further shown in FIG. 3, and by reference number 340, the UE may set the transmission power of the communication signal according to whether the UE detects the user in the near field. For example, the UE may reduce the transmission power of the communication signal to an MPE level that corresponds to the user being within the near field of the UE.

In some aspects, the UE may set the transmission power according to whether the UE determines that the user is gripping the UE. For example, the UE may set the transmission power to a first MPE level when the UE determines that the user is gripping the UE or a second MPE when the UE determines that the user is not gripping the UE but is within the near field. In such a case, the second MPE level may be a greater transmission power than the first MPE level because the user is not as close to the UE as is when the user is gripping the UE, and thus not subject to as high an amount of radiation exposure from the communication signal. Accordingly, although the user is within the near field, if the user is not gripping the UE, a relatively stronger transmission power can be used for the communication signal to improve signal quality and/or range of the communication signal relative to when the user is gripping the UE.

In some aspects, when the UE determines that the UE is not within the near field, the UE may use the one or more measurements of the radar signal to determine whether the user is within a far field of the UE. For example, the UE may determine a return frequency, a bandwidth, and/or the like associated with the measurements of the radar signal and determine whether the user is within the far field based at least in part on the return frequency, the bandwidth, and/or the like. Based at least in part on determining that the user is within the far field (but not the near field) of the UE, the UE may increase the transmission power from an MPE level associated with the user being within the near field (e.g., if the UE previously determined that the user was in the near field) or decrease the transmission power from the MPE level associated with the user being beyond the far field (e.g., if the UE previously determined that the user was not in the far field).

According to some aspects, if the UE determines that the user is within the near field, after reducing the transmission power of a communication signal to an MPE level that corresponds to the user being within the near field, the UE may determine (e.g., based at least in part on the energy level returning to the reference energy level and/or an amount of the energy variation being reduced to zero or within a threshold range of zero) that the user is outside of the near field, and increase the transmission power of the communication signal according to the UE being in the far field (e.g., to an MPE level corresponding to a proximity to the user determined based at least in part on a proximity analysis associated with the far field of the UE) and/or beyond the far field (e.g., a maximum transmission power for the communication signal).

In this way, the UE may control and/or set the transmission power for the communication signal according to whether the user is determined, using the radar signal, to be within the near field of the UE, within the far field of the UE, or beyond the far field of the UE, as described herein.

As indicated above, FIG. 3 is provided merely as one or more examples. Other examples may differ from what is described with regard to FIG. 3.

Figure 4:
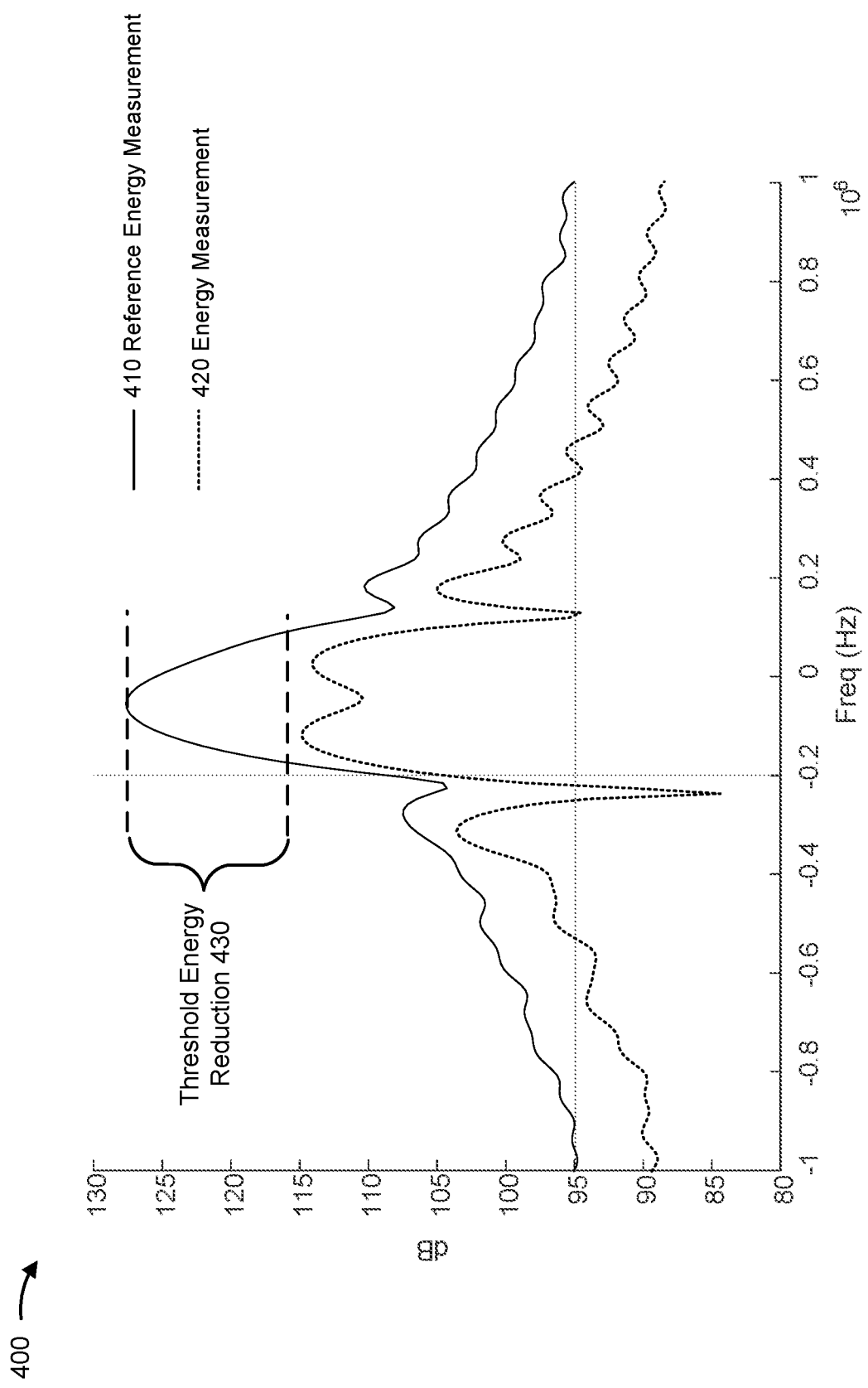

FIG. 4 is a diagram conceptually illustrating an example 400 associated with near field user detection using a radar signal analysis associated with a user equipment in accordance with various aspects of the present disclosure. Example 400 includes a graph of energy measurements that represent a threshold reduction in an energy level. More specifically, example 400 includes a graph of a reference energy measurement 410, corresponding to a reference energy level for a UE, an energy measurement 420 of a radar signal of the UE, and a threshold energy reduction 430.

Accordingly, as shown in the graph of example 400, if a UE is calibrated to use the reference energy level to detect the threshold energy reduction, and the UE received the energy measurement of example 400, the UE may determine that a user is within the near field of the UE and/or that the user is gripping the UE. As indicated above, FIG. 4 is provided merely as one or more examples. Other examples may differ from what is described with regard to FIG. 4.

Figure 5:
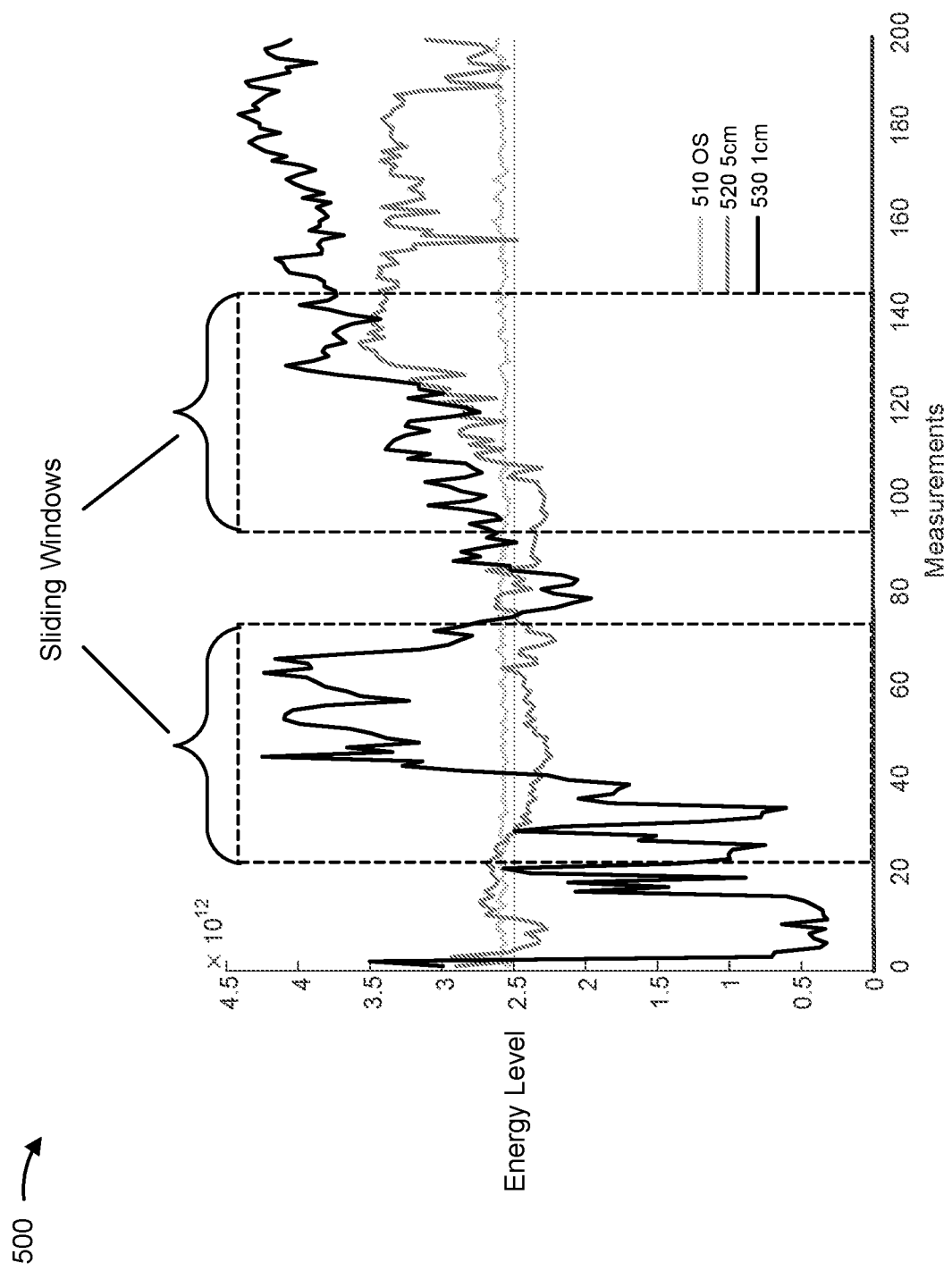

FIG. 5 is a diagram conceptually illustrating an example 500 associated with near field user detection using a radar signal analysis associated with a user equipment in accordance with various aspects of the present disclosure. Example 500 includes a graph illustrating how distance affects energy variation within sliding windows of the measurements. More specifically, example 500 includes a graph 510 of energy measurements of a radar signal when the UE is in open space (OS), a graph 520 of energy measurements of the radar signal when the UE is approximately 5 cm from the user (referred to herein as "the 5 cm energy measurements 520"), and a graph 530 of energy measurements when the UE is approximately 1 cm from the user (referred to herein as "the 1 cm energy measurements 530"). As shown, the variation in the energy level of the radar signal within the sliding windows of measurements increases as the user becomes closer to the UE.

Accordingly, as shown in the graph of example 500, if a UE is calibrated to use the amount of variation in the 5 cm energy measurements 520 as a threshold amount of variation, the UE may determine that the user is within the near field of the UE when the threshold amount of variation is greater than the amount of variation in the 5 cm energy measurements 520 (and/or if the variation is between the variation in the 1 cm energy measurements 530 and the variation in the 5 cm energy measurements 520). As indicated above, FIG. 5 is provided merely as one or more examples. Other examples may differ from what is described with regard to FIG. 5.

Figure 6:
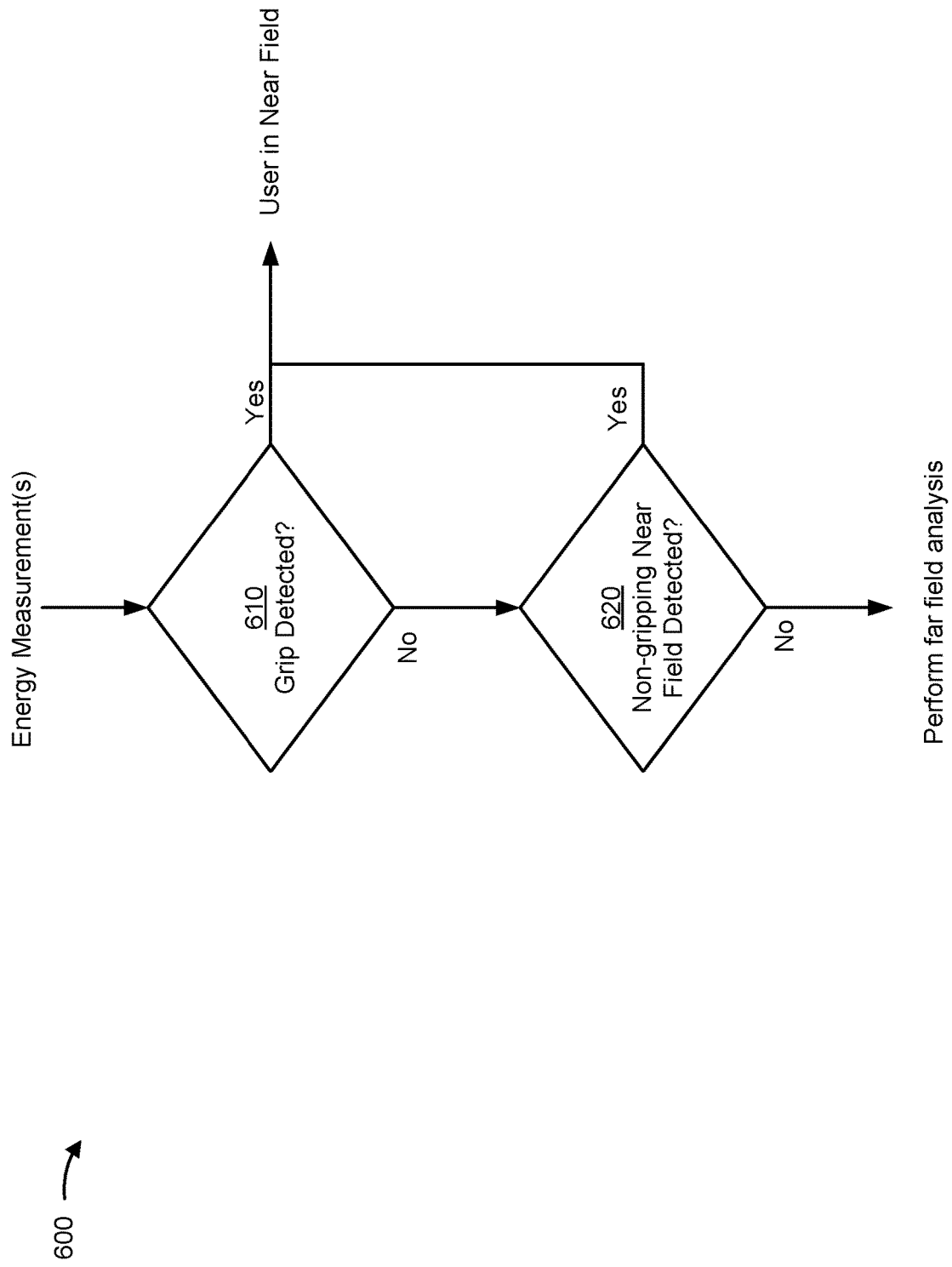

FIG. 6 is a diagram conceptually illustrating an example 600 associated with near field user detection using a radar signal analysis associated with a user equipment in accordance with various aspects of the present disclosure. Example 600 includes an example logical flow to analyze one or more measurements associated with a radar signal to determine whether a user is in a near field or far field of a UE, as described herein.

As shown in example 600, and by reference number 610, the UE may determine whether the user is gripping the UE. For example, the UE may determine whether an energy measurement indicates an energy reduction satisfying a threshold energy reduction associated with the radar signal. If the energy measurement indicates the threshold energy reduction, the UE may determine that a user is in a near field of the UE and correspondingly set the transmission power of the UE to an MPE level associated with the user being within the near field of the UE.

On the other hand, if the energy measurement does not indicate the threshold energy reduction associated with the radar signal, the UE may determine that a user is not gripping the UE, and the UE may determine whether the user is within the near field without gripping the UE, as shown by reference number 620. For example, the UE may determine whether energy variation in a sliding window of the energy measurements indicates an amount of energy variation satisfying a threshold amount of energy variation corresponding to the user being in the near field. If the sliding window of energy measurements indicates the threshold amount of energy variation, the UE may determine that the user is in the near field. On the other hand, if the sliding window of energy measurements does not indicate or have a threshold amount of energy variation, the UE may perform a far field analysis to determine whether a user is in a far field of the UE.

As indicated above, FIG. 6 is provided merely as one or more examples. Other examples may differ from what is described with regard to FIG. 6.

Figure 7:
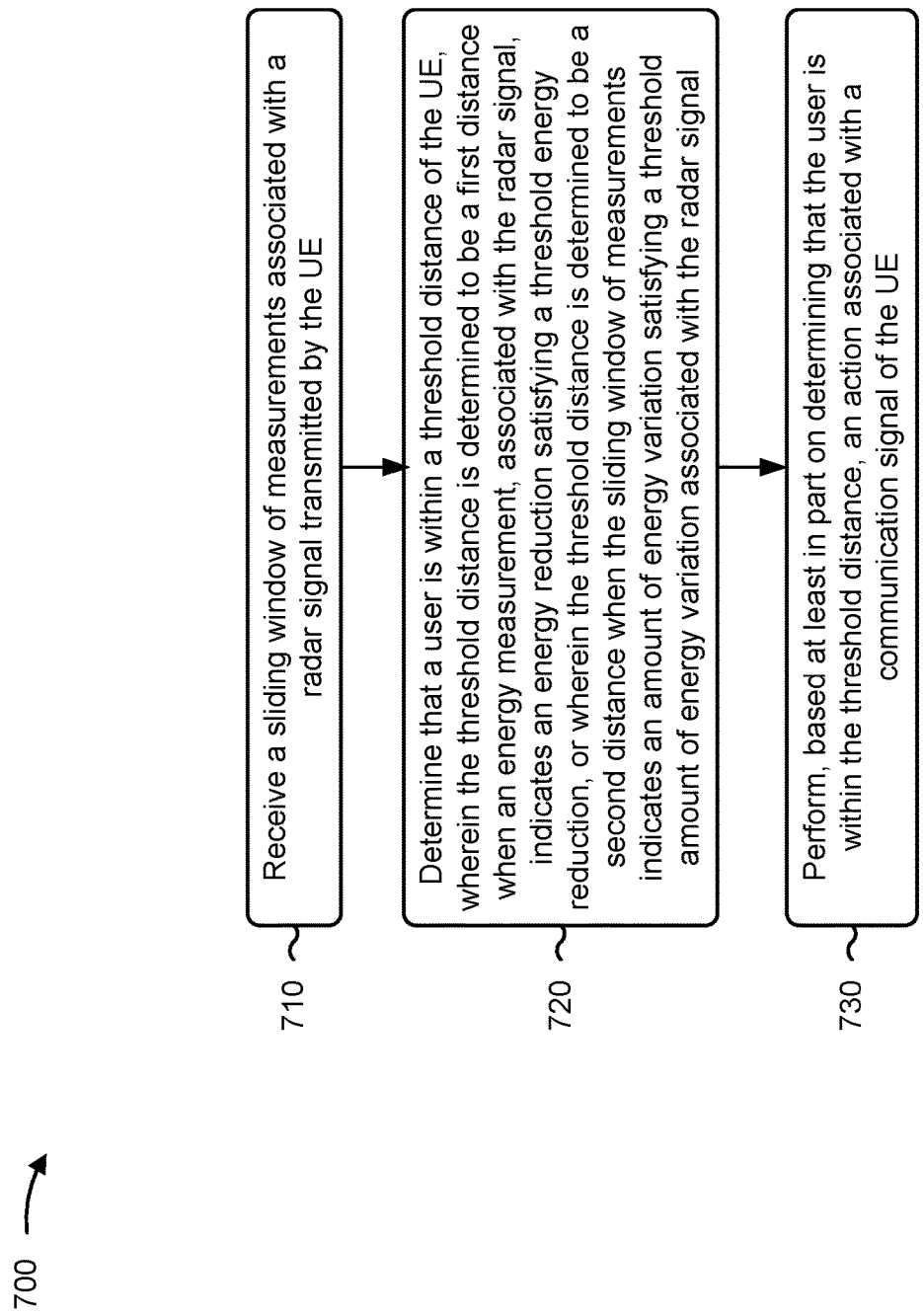
FIG. 7 is a flowchart of an example process associated with near field user detection using a radar signal analysis associated with a user equipment.

FIG. 7 is a flowchart of an example process 700 associated with near field user detection using a radar signal analysis associated with a user equipment. In some aspects, one or more process blocks of FIG. 7 may be performed by a UE (e.g., UE 120, device 200, and/or the like). In some aspects, one or more process blocks of FIG. 7 may be performed by another device or a group of devices separate from or including the UE.

As shown in FIG. 7, process 700 may include receiving a sliding window of measurements associated with a radar signal transmitted by the UE (block 710). For example, the UE (e.g., using processor 220, memory 230, storage component 240, input component 250, output component 260, communication interface 270, antenna 280, and/or the like)

may receive a sliding window of measurements associated with a radar signal transmitted by the UE, as described above.

As further shown in FIG. 7, process 700 may include determining that a user is within a threshold distance of the UE, wherein the threshold distance is determined to be a first distance when an energy measurement, associated with the radar signal, indicates an energy reduction satisfying a threshold energy reduction, or wherein the threshold distance is determined to be a second distance when the sliding window of measurements indicates an amount of energy variation satisfying a threshold amount of energy variation associated with the radar signal (block 720). For example, the UE (e.g., using processor 220, memory 230, storage component 240, input component 250, output component 260, communication interface 270, antenna 280, and/or the like) may determine that a user is within a threshold distance of the UE, as described above. In some aspects, the threshold distance is determined to be a first distance when an energy measurement, associated with the radar signal, indicates an energy reduction satisfying a threshold energy reduction. In some aspects, the threshold distance is determined to be a second distance when the sliding window of measurements indicates an amount of energy variation satisfying a threshold amount of energy variation associated with the radar signal.

As further shown in FIG. 7, process 700 may include performing, based at least in part on determining that the user is within the threshold distance, an action associated with a communication signal of the UE (block 730). For example, the UE (e.g., using processor 220, memory 230, storage component 240, input component 250, output component 260, communication interface 270, antenna 280, and/or the like) may perform, based at least in part on determining that the user is within the threshold distance, an action associated with a communication signal of the UE, as described above.

Process 700 may include additional aspects, such as any single aspect or any combination of aspects described below and/or in connection with one or more other processes described elsewhere herein.

In a first aspect, the threshold distance is less than or equal to four centimeters. In a second aspect, alone or in combination with the first aspect, the second distance is farther than the first distance. In a third aspect, alone or in combination with one or more of the first and second aspects, based at least in part on determining that the threshold distance is not the first distance according to the energy measurement, the sliding window of measurements is analyzed to determine whether the threshold distance is the second distance.

In a fourth aspect, alone or in combination with one or more of the first through third aspects, the energy measurement is a measurement of the sliding window of measurements.

In a fifth aspect, alone or in combination with one or more of the first through fourth aspects, the threshold distance corresponds to a threshold that is between a near field of the UE and a far field of the UE, and the user is determined to be within the near field when the user is within the threshold distance. In a sixth aspect, in combination with the fifth aspect, the radar signal is used to determine that the user is within the far field based at least in part on a return frequency associated with the radar signal.

In a seventh aspect, alone or in combination with one or more of the first through sixth aspects, the radar signal comprises a frequency modulated continuous wave signal.

In an eighth aspect, alone or in combination with one or more of the first through seventh aspects, the threshold amount of energy variation is determined based at least in part on a degree of variation in a plurality of measurements of an energy level of the radar signal within the sliding window. In a ninth aspect, alone or in combination with one or more of the first through eighth aspects, when the threshold distance is the second distance, the user is determined to be within a distance range of the UE that is between the first distance and the second distance.

In a tenth aspect, alone or in combination with one or more of the first through ninth aspects, performing the action comprises transmitting the communication signal from the UE with a transmission power that is determined according to the energy measurement indicating the threshold energy reduction or the sliding window of measurements indicating the threshold amount of energy variation. In an eleventh aspect, alone or in combination with one or more of the first through tenth aspects, performing the action comprises setting a transmission power of the communication signal of the UE to a threshold level.

In a twelfth aspect, in combination with the eleventh aspect, the threshold level is a first maximum permissible exposure level associated with the communication signal when the user is determined to be within the first distance based at least in part on the energy measurement indicating the threshold energy reduction, and the threshold level is a second maximum permissible exposure level associated with the communication signal when the user is determined to be between the first distance and the second distance based at least in part on the sliding window of measurements indicating the threshold amount of energy variation.

In a thirteenth aspect, in combination with one or more of the eleventh through twelfth aspects, the UE, when setting the transmission power of the communication signal, may reduce the transmission power to the first maximum permissible exposure level from at least one of: the second maximum permissible exposure level, or a third maximum permissible exposure level associated with the communication signal when the user is determined to not be within the threshold distance; reduce the transmission power to the second maximum permissible exposure level from the third maximum permissible exposure level; or increase the transmission power to the second maximum permissible exposure level from the first maximum permissible exposure level.

In a fourteenth aspect, in combination with one or more of the eleventh through thirteenth aspects, the UE may determine, based at least in part on the sliding window of measurements, that the user is no longer within the threshold distance of the UE; and increase, from the threshold level, the transmission power of the communication signal of the UE.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:
   receiving, by a user equipment (UE), one or more measurements associated with a radar signal transmitted by the UE;
   determining, by the UE, whether a user is within a near field of the UE based on the one or more measurements associated with the radar signal,
      wherein the near field is within less than or equal to four centimeters of the user; and
   setting, by the UE and based at least in part on determining whether the user is within the near field of the UE, a transmission power, of a communication signal of the UE, to a threshold level,
      wherein the threshold level is a first maximum permissible exposure level associated with the communication signal when the user is determined to be within the near field of the UE based at least in part on an energy measurement, of the one or more measurements associated with the radar signal, indicating a threshold energy reduction, and
      wherein the threshold level is a second maximum permissible exposure level associated with the communication signal when the user is determined to be between the near field of the UE and a far field of the UE based at least in part on a sliding window of measurements, of the one or more measurements associated with the radar signal, indicating a threshold amount of energy variation.

2. The method of claim 1, wherein the sliding window of measurements comprise the energy measurement.

3. The method of claim 1, wherein the radar signal is capable of being used to determine that the user is within the far field based at least in part on a return frequency associated with the radar signal.

4. The method of claim 1, wherein the radar signal comprises a frequency modulated continuous wave signal.

5. The method of claim 1,
   wherein the threshold amount of energy variation is based at least in part on a degree of variation in a plurality of measurements of an energy level of the radar signal within the sliding window of measurements.

6. The method of claim 1, further comprising:
   transmitting the communication signal from the UE with the transmission power.

7. The method of claim 1, wherein setting the transmission power of the communication signal comprises:
   reducing the transmission power to the first maximum permissible exposure level from at least one of:
      the second maximum permissible exposure level, or
      a third maximum permissible exposure level associated with the communication signal when the user is determined to not be within a threshold distance;
   reducing the transmission power to the second maximum permissible exposure level from the third maximum permissible exposure level; or
   increasing the transmission power to the second maximum permissible exposure level from the first maximum permissible exposure level.

8. The method of claim 1, further comprising:
   determining, based at least in part on the sliding window of measurements, that the user is no longer within the near field; and
   increasing, from the threshold level, the transmission power of the communication signal.

9. A user equipment (UE) for wireless communication, comprising:
   a memory; and
   one or more processors configured to:
      receive one or more measurements associated with a radar signal transmitted by the UE;
      determine whether a user is within a near field of the UE based on the one or more measurements associated with the radar signal,
         wherein the near field is within less than or equal to four centimeters of the user; and
      set, based at least in part on determining whether the user is within the near field of the UE, a transmission power, of a communication signal of the UE, to a threshold level,
         wherein the threshold level is a first maximum permissible exposure level associated with the communication signal when the user is determined to be within the near field of the UE based at least in part on an energy measurement, of the one or more measurements associated with the radar signal, indicating a threshold energy reduction, and wherein the threshold level is a second maximum permissible exposure level associated with the communication signal when the user is determined to be between the near field of the UE and a far field of the UE based at least in part on a sliding window of measurements, of the one or more measurements associated with the radar signal, indicating a threshold amount of energy variation.

10. The UE of claim 9, wherein the sliding window of measurements comprise the energy measurement.

11. The UE of claim 9, wherein the one or more measurements correspond to energy levels of reflections of the radar signal.

12. The UE of claim 9, wherein the far field is greater than four centimeters of the user and less than or equal to 15 centimeters of the user.

13. The UE of claim 9, wherein the radar signal is a frequency-modulated continuous wave (FMCW) signal.

14. The UE of claim 9, wherein the one or more processors are further configured to:
transmit the communication signal from the UE with the transmission power.

15. The UE of claim of 9, wherein, when setting the transmission power of the communication signal, the one or more processors are configured to:
reduce the transmission power to the first maximum permissible exposure level from the second maximum permissible exposure level.

16. The UE of claim of 9, wherein, when setting the transmission power of the communication signal, the one or more processors are configured to:
reduce the transmission power to the first maximum permissible exposure level from a third maximum permissible exposure level associated with the communication signal when the user is determined to not be within a threshold distance.

17. The UE of claim of 9, wherein, when setting the transmission power of the communication signal, the one or more processors are configured to:
reduce the transmission power to the second maximum permissible exposure level from a third maximum permissible exposure level associated with the communication signal when the user is determined to not be within a threshold distance.

18. The UE of claim of 9, wherein, when setting the transmission power of the communication signal, the one or more processors are configured to:
increase the transmission power to the second maximum permissible exposure level from the first maximum permissible exposure level.

19. The UE of claim of 9, wherein the one or more processors are further configured to:
determine, based at least in part on the sliding window of measurements, that the user is no longer within the near field; and
increase, from the threshold level, the transmission power of the communication signal.

20. A non-transitory computer-readable medium storing one or more instructions for wireless communication, the one or more instructions comprising:
one or more instructions that, when executed by one or more processors of a UE, cause the one or more processors to:
receive one or more measurements associated with a radar signal transmitted by the UE;
determine whether a user is within a near field of the UE based on the one or more measurements associated with the radar signal,
wherein the near field is within less than or equal to four centimeters of the user; and
set, based at least in part on determining whether the user is within the near field of the UE, a transmission power, of a communication signal of the UE, to a threshold level,
wherein the threshold level is a first maximum permissible exposure level associated with the communication signal when the user is determined to be within the near field of the UE based at least in part on an energy measurement, of the one or more measurements associated with the radar signal, indicating a threshold energy reduction, and
wherein the threshold level is a second maximum permissible exposure level associated with the communication signal when the user is determined to be between the near field of the UE and a far field of the UE based at least in part on a sliding window of measurements, of the one or more measurements associated with the radar signal, indicating a threshold amount of energy variation.

21. The non-transitory computer-readable medium of claim 20, wherein the sliding window of measurements comprise the energy measurement.

22. The non-transitory computer-readable medium of claim 20, wherein the radar signal is a frequency-modulated continuous wave (FMCW) signal.

23. An apparatus for wireless communication, comprising:
means for receiving one or more measurements associated with a radar signal transmitted by the apparatus;
means for determining whether a user is within a near field of the apparatus based on the one or more measurements associated with the radar signal,
wherein the near field is within less than or equal to four centimeters of the user; and
means for setting, based at least in part on determining whether the user is within the near field of the apparatus, a transmission power, of a communication signal of the apparatus, to a threshold level,
wherein the threshold level is a first maximum permissible exposure level associated with the communication signal when the user is determined to be within the near field of the apparatus based at least in part on an energy measurement, of the one or more measurements associated with the radar signal, indicating a threshold energy reduction, and
wherein the threshold level is a second maximum permissible exposure level associated with the communication signal when the user is determined to be between the near field of the apparatus and a far field of the apparatus based at least in part on a sliding window of measurements, of the one or more measurements associated with the radar signal, indicating a threshold amount of energy variation.

24. The apparatus of claim 23, wherein the sliding window of measurements comprise the energy measurement.

25. The apparatus of claim 23, wherein the radar signal is a frequency-modulated continuous wave (FMCW) signal.

26. The apparatus of claim of 23, where the means for setting the transmission power of the communication signal comprise:

means for reducing the transmission power to the first maximum permissible exposure level from the second maximum permissible exposure level.

27. The apparatus of claim of 23, where the means for setting the transmission power of the communication signal comprise:

means for reducing the transmission power to the first maximum permissible exposure level from a third maximum permissible exposure level associated with the communication signal when the user is determined to not be within a threshold distance.

28. The apparatus of claim of 23, where the means for setting the transmission power of the communication signal comprise:

means for reducing the transmission power to the second maximum permissible exposure level from a third maximum permissible exposure level associated with the communication signal when the user is determined to not be within a threshold distance.

29. The apparatus of claim of 23, where the means for setting the transmission power of the communication signal comprise:

means for increasing the transmission power to the second maximum permissible exposure level from the first maximum permissible exposure level.

30. The apparatus of claim of 23, further comprising:

means for determining, based at least in part on the sliding window of measurements, that the user is no longer within the near field; and means for increasing, from the threshold level, the transmission power of the communication signal.

* * * * *